(12) United States Patent
Long et al.

(10) Patent No.: US 11,102,170 B2
(45) Date of Patent: Aug. 24, 2021

(54) ROUTE DELIVERY METHOD AND DEVICE

(71) Applicant: HUAWEI TECHNOLOGIES CO., LTD., Guangdong (CN)

(72) Inventors: Sirui Long, Beijing (CN); Xiaodong Sun, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 73 days.

(21) Appl. No.: 16/569,946

(22) Filed: Sep. 13, 2019

(65) Prior Publication Data

US 2020/0008126 A1 Jan. 2, 2020

Related U.S. Application Data

(63) Continuation of application No. PCT/CN2018/077018, filed on Feb. 23, 2018.

(30) Foreign Application Priority Data

Mar. 16, 2017 (CN) .......................... 201710157891.5

(51) Int. Cl.
*H04L 29/12* (2006.01)
*H04W 4/02* (2018.01)
*H04W 8/28* (2009.01)
*H04W 40/20* (2009.01)
*H04W 40/24* (2009.01)

(52) U.S. Cl.
CPC ......... *H04L 61/2015* (2013.01); *H04W 4/025* (2013.01); *H04W 8/28* (2013.01);
(Continued)

(58) Field of Classification Search
CPC ... H04W 40/20; H04W 40/248; H04W 4/025; H04W 8/28; H04W 8/26; H04L 61/2015; H04L 61/203

See application file for complete search history.

(56) References Cited

U.S. PATENT DOCUMENTS

2008/0301273 A1 12/2008 Brown et al.
2014/0372599 A1 12/2014 Gutt et al.
(Continued)

FOREIGN PATENT DOCUMENTS

CN 103974237 A 8/2014
CN 104869178 A 8/2015
(Continued)

OTHER PUBLICATIONS

3GPP TR 23.714 V0.2.0 (Nov. 2015),3rd Generation Partnership Project;Technical Specification Group Services and System Aspects;Study on control and user plane separation of EPC nodes(Release 14),total 24 pages.
(Continued)

*Primary Examiner* — Min Jung
(74) *Attorney, Agent, or Firm* — Womble Bond Dickinson (US) LLP

(57) ABSTRACT

The application relates to a route delivery method and device. A location information of user equipment UE is received by a control plane network element device. A client IP address used by the control plane network element device to access a third-party server is determined based on the location information by the control plane network element device. An access request message is sent by the control plane network element device to the third-party server carrying the client IP address. A UE IP address assigned by the third-party server to the UE based on the client IP address is received by the control plane network element device. A user plane network element device configured to deliver a route to the UE is determined based on the UE IP address and the location information by the control plane network element device.

19 Claims, 9 Drawing Sheets

(52) U.S. Cl.
CPC ......... *H04W 40/20* (2013.01); *H04W 40/248* (2013.01); *H04L 61/203* (2013.01)

(56) References Cited

U.S. PATENT DOCUMENTS

| | | | |
|---|---|---|---|
| 2015/0052234 A1 | 2/2015 | Hahn | |
| 2017/0150420 A1* | 5/2017 | Olsson | H04W 8/06 |
| 2017/0208634 A1* | 7/2017 | Bharatia | H04W 76/11 |
| 2018/0242198 A1* | 8/2018 | Choi | H04W 28/18 |
| 2019/0037474 A1* | 1/2019 | Xu | H04W 64/00 |
| 2019/0141618 A1* | 5/2019 | Yin | H04W 8/082 |
| 2020/0059525 A1* | 2/2020 | Zhu | H04L 61/1511 |

FOREIGN PATENT DOCUMENTS

| | | |
|---|---|---|
| CN | 106453681 A | 2/2017 |
| CN | 106993067 A | 7/2017 |
| EP | 2919444 A1 | 9/2015 |

OTHER PUBLICATIONS

XP032341446 Hiroyuki Ishii et al.,"A novel architecture for LTE-B :C-plane/U-plane split and Phantom Cell concept",2012 IEEE Globecom Workshops,total 7 pages.

XP055645810 Ayman Elnashar et al:"Deployment Strategy of LTE Network:Practical Approach,A"In:"Design, Deployment and Performance of 4G-LTE Networks",John WileyandSons,Ltd.,dated Apr. 15, 2014,total 76 pages.

S2-160149 Ericsson,"UE IP address allocation",SA WG2 Meeting #113,Jan. 25-29, 2016, Saint Kitts, KN,total 7 pages.

S2-161554 Nokia,"Selection of user plane functional entity deployed at the edge local network",SA WG2 Meeting #114,Apr. 11-15, 2016, Sophia Antipolis, France,total 3 pages.

S2-160773 Cisco Systems, Inc.,"Considerations and solution for UE IP address management",SA WG2 Meeting #113,Jan. 25-29, 2016, Saint Kitts, KN,total 6 pages.

* cited by examiner

ROUTE DELIVERY METHOD AND DEVICE

CROSS-REFERENCE TO RELATED APPLICATIONS

This application is a continuation of International Application No. PCT/CN2018/077018, filed on Feb. 23, 2018, which claims priority to Chinese Patent Application No. 201710157891.5, filed on Mar. 16, 2017. The disclosures of the aforementioned applications are hereby incorporated by reference in their entireties.

TECHNICAL FIELD

This application relates to the field of route assignment technologies, and in particular, to a route delivery method and device.

BACKGROUND

When a user equipment (UE) accesses a system network, a system needs to assign an IP address to the UE, and advertises, based on the IP address of the UE, a route for accessing the network by the UE.

In a typical communications system, to be specific, in a communications system in which a control plane (CP) network element device and a user plane (UP) network element device are integrated together, a packet data network gateway (PGW) or a third-party server assigns an IP address to UE. When the third-party server assigns the IP address to the UE, the PGW sends a request message to the third-party server, where the request message carries an IP address (referred to as a PGW IP address) of the PGW serving as a client of the third-party server. The third-party server binds different PGW IP addresses to different address pools. After receiving the request message sent by the PGW, the third-party server assigns the UE the IP address (referred to as a UE IP address) from a corresponding address pool based on a PGW IP address in the request message, and returns the UE IP address to the PGW. After receiving the UE IP address, the PGW determines, based on the UE IP address, a route for accessing the network by the UE.

With development of a communications network, a system architecture in which a CP network element and a UP network element are separated is defined in a 3GPP standard, and separation between a CP network element and a UP network element is referred to as CU separation. In the CU-separated system architecture, an original PGW is split into a PGW-C and a PGW-U, and an original SGW is split into an SGW-C and an SGW-U. During system deployment, one CP network element may correspond to one or more UP network elements, and different UP network elements may cover different tracking area list (TA list) ranges.

In the CU-separated system architecture, the PGW-C or the third-party server assigns the UE IP address. Regardless of an assignment manner, the PGW-C sends the UE IP address to the PGW-U, and the PGW-U delivers a route from the UE to the network based on the UE IP address.

In a possible scenario, two UEs respectively belong to two TA lists, the two TA lists respectively correspond to UP network elements, and the UP network elements respectively corresponding to the two TA lists correspond to one CP network element. When the third-party server assigns the UE IP address, when the two UEs need to access the network, the CP network element interacts with the third-party server by using a same PGW IP address, and the third-party server assigns the two UEs UE IP addresses from a corresponding address pool based on the PGW IP address. The UE IP addresses assigned by the third-party server to the two UEs may belong to a same network segment. Consequently, different UP network elements may deliver a same network segment route to the two UEs. If the same network segment route is delivered to the two UEs, it cannot be ensured that a downlink data packet from the network to the UE is forwarded to the UE by using a correct PGW-U.

SUMMARY

Embodiments of the invention relate to a route delivery method and device, so as to resolve a problem that a same network segment route may be assigned to different UEs when a third-party server assigns a UE IP address in a CU-separated system architecture.

At least one embodiment of the invention provides a route delivery method that includes receiving, by a control plane network element device, location information of user equipment UE;

determining, by the control plane network element device based on the location information, a client IP address used by the control plane network element device to access a third-party server;

sending, by the control plane network element device, an access request message to the third-party server by using the client IP address;

receiving, by the control plane network element device, a UE IP address assigned by the third-party server to the UE based on the client IP address; and determining, by the control plane network element device based on the UE IP address and the location information, a user plane network element device configured to deliver a route to the UE.

In at least some embodiments, a mapping relationship is established between a location information of the UE and a client IP address. In a process of activating the UE, the control plane network element device determines, based on a location information of the UE, a client IP address used to access the third-party server. Therefore, when UEs in different user plane network element devices managed by the control plane network element device are activated, the control plane network element device accesses the third-party server by using different client IP addresses, so as to avoid a case in which UE IP addresses assigned by the third-party server to different UEs belong to a same network segment.

In at least some embodiments, the receiving, by a control plane network element device, location information of UE includes receiving, by the control plane network element device, a create session request message, where the create session request message carries the location information or indication information of the location information.

In at least one embodiment of the invention, the control plane network element device determines the location information of the UE based on the location information or the indication information of the location information in the received create session request message.

In at least some embodiments, the determining, by the control plane network element device based on the location information, a client IP address used by the control plane network element device to access a third-party server includes determining, by the control plane network element device based on the location information of the UE, a location area to which the UE belongs; and selecting, by the control plane network element device, one of at least one candidate IP address corresponding to the location area as the client IP address.

In at least some embodiments, one location area corresponds to at least one candidate IP address. After the control plane network element device determines the location information of the UE, the control plane network element device determines, based on the location information of the UE, the location area to which the UE belongs, and selects one of the at least one candidate IP address corresponding to the location area to which the UE belongs as the client IP address.

In at least some embodiments, when the location area corresponds to a plurality of candidate IP addresses, the selecting, by the control plane network element device, one of a plurality of candidate IP addresses corresponding to the location area as the client IP address includes selecting, by the control plane network element device from the plurality of candidate IP addresses corresponding to the location area, one candidate IP address whose usage frequency is less than a preset threshold as the client IP address.

In at least some embodiments, the control plane network element device may select, from the at least one candidate IP address corresponding to the location area, the candidate IP address whose usage frequency is less than the preset threshold as the client IP address, thereby keeping usage frequency of each client IP address corresponding to the location area relatively balanced.

In at least some embodiments, the client IP address corresponds to an address range, and the address range is divided into a plurality of sub address segments.

The determining, by the control plane network element device based on the UE IP address and the location information, a user plane network element device configured to deliver a route to the UE includes determining, by the control plane network element device, a sub address segment to which the UE IP address belongs; and determining, by the control plane network element device based on the sub address segment to which the UE IP address belongs and the location area to which the UE belongs, the user plane network element device configured to deliver a route to the UE.

In at least some embodiments, the address range corresponding to the client IP address is divided into the plurality of sub address segments. When determining the user plane network element device configured to deliver a route to the UE, the control plane network element device determines the sub address segment to which the UE IP address belongs, and then determines, based on the sub address segment to which the UE IP address belongs and the location area to which the UE belongs, the user plane network element device configured to deliver a route to the UE.

In at least some embodiments, the determining, by the control plane network element device based on the sub address segment to which the UE IP address belongs and the location area to which the UE belongs, the user plane network element device configured to deliver a route to the UE includes when the location area to which the UE belongs corresponds to a plurality of user plane network element devices, determining, by the control plane network element device, whether an available route corresponding to the sub address segment to which the UE IP address belongs is delivered; and if the available route is delivered, selecting, by the control plane network element device, a user plane network element device that delivers the available route to deliver the route to the UE.

At least one embodiment of the invention provides a route delivery method that includes receiving, by a control plane network element device, location information of UE, and determining, based on the location information, a location area to which the UE belongs;

sending, by the control plane network element device, information about the location area to a user plane network element device, so that the user plane network element device determines, based on the information about the location area, a client IP address used by the user plane network element device to access a third-party server;

receiving, by the control plane network element device, a UE IP address sent by the user plane network element device, where the UE IP address is assigned by the third-party server based on the client IP address when the user plane network element device accesses the third-party server by using the client IP address; and determining, by the control plane network element device based on the UE IP address and the information about the location area, another user plane network element device configured to deliver a route to the UE.

The another user plane network element device and the user plane network element device that receives the information about the location area may be a same device, or may be different devices.

In at least some embodiments, a mapping relationship is established between a location information of the UE and a client IP address. In a process of activating the UE, the control plane network element device determines, based on a location information of the UE, a client IP address used to access the third-party server. Therefore, when UEs in different user plane network element devices managed by the control plane network element device are activated, the control plane network element device accesses the third-party server by using different client IP addresses, so as to avoid a case in which UE IP addresses assigned by the third-party server to different UEs belong to a same network segment.

In at least some embodiments, the receiving, by a control plane network element device, location information of UE includes receiving, by the control plane network element device, a create session request message, where the create session request message carries the location information or indication information of the location information.

In at least some embodiments, the client IP address corresponds to an address range, and the address range is divided into a plurality of sub address segments.

The determining, by the control plane network element device based on the UE IP address and the information about the location area, another user plane network element device configured to deliver a route to the UE includes determining, by the control plane network element device, a sub address segment to which the UE IP address belongs; and determining, by the control plane network element device based on the sub address segment to which the UE IP address belongs and the location area to which the UE belongs, the another user plane network element device configured to deliver a route to the UE.

In at least some embodiments, the determining, by the control plane network element device based on the sub address segment to which the UE IP address belongs and the location area to which the UE belongs, the another user plane network element device configured to deliver a route to the UE includes when the location area to which the UE belongs corresponds to a plurality of user plane network element devices, determining, by the control plane network element device, whether an available route corresponding to the sub address segment to which the UE IP address belongs is delivered; and if the available route is delivered, selecting, by the control plane network element device, a user plane network element device that delivers the available route to deliver the route to the UE.

At least one embodiment of the invention provides a route delivery method that includes receiving, by a user plane network element device, information about a location area sent by a control plane network element device;

determining, by the user plane network element device based on the information about the location area, a client IP address used by the user plane network element device to access a third-party server;

sending, by the user plane network element device, an access request message to the third-party server by using the client IP address;

receiving, by the user plane network element device, a UE IP address assigned by the third-party server to the UE based on the client IP address; and sending, by the user plane network element device, the UE IP address to the control plane network element device, so that the control plane network element device determines, based on the UE IP address and the information about the location area, another user plane network element device configured to deliver a route to the UE.

In at least some embodiments, the control plane network element device interacts with the third-party server by using the user plane network element device, and the user plane network element device determines, based on the location area to which the UE belongs, the client IP address used by the user plane network element device to access the third-party server. Therefore, when UEs in different user plane network element devices managed by the control plane network element device are activated, the user plane network element device may access the third-party server by using different client IP addresses, so as to avoid a case in which UE IP addresses assigned by the third-party server to different UEs belong to a same network segment.

In at least some embodiments, the determining, by the user plane network element device based on the information about the location area, a client IP address used by the user plane network element device to access a third-party server includes selecting, by the control plane network element device, one of at least one candidate IP address corresponding to the location area as the client IP address.

In at least some embodiments, when the location area corresponds to a plurality of candidate IP addresses, the selecting, by the control plane network element device, one of a plurality of candidate IP addresses corresponding to the location area as the client IP address includes selecting, by the control plane network element device from the plurality of candidate IP addresses corresponding to the location area, one candidate IP address whose usage frequency is less than a preset threshold as the client IP address.

In at least some embodiments, to implement the route delivery method in the first aspect, an embodiment of the invention provides a route delivery apparatus, and the apparatus has a function of implementing behavior of the control plane network element device in the route delivery method in the first aspect. The function may be implemented by hardware, or may be implemented by hardware by executing corresponding software. The hardware or the software includes one or more modules corresponding to the function.

In at least some embodiments, the apparatus includes:

a receiving unit, configured to receive location information of user equipment UE;

a determining unit, configured to determine, based on the location information, a client IP address used by the control plane network element device to access a third-party server; and a sending unit, configured to send an access request message to the third-party server by using the client IP address.

The receiving unit is further configured to receive a UE IP address assigned by the third-party server to the UE based on the client IP address.

The determining unit is further configured to determine, based on the UE IP address and the location information, a user plane network element device configured to deliver a route to the UE.

In at least some embodiments the receiving unit receiving location information of UE includes receiving a create session request message, where the create session request message carries the location information or indication information of the location information.

In at least some embodiments the determining unit determining, based on the location information, a client IP address used by the control plane network element device to access a third-party server includes determining, based on the location information of the UE, a location area to which the UE belongs; and selecting one of at least one candidate IP address corresponding to the location area as the client IP address.

In at least some embodiments, when the location area corresponds to a plurality of candidate IP addresses, the determining unit selecting one of a plurality of candidate IP addresses corresponding to the location area as the client IP address includes selecting, from the plurality of candidate IP addresses corresponding to the location area, one candidate IP address whose usage frequency is less than a preset threshold as the client IP address.

In at least some embodiments, the client IP address corresponds to an address range, and the address range is divided into a plurality of sub address segments.

The determining unit determining, based on the UE IP address and the location information, a user plane network element device configured to deliver a route to the UE includes determining a sub address segment to which the UE IP address belongs; and determining, based on the sub address segment to which the UE IP address belongs and the location area to which the UE belongs, the user plane network element device configured to deliver a route to the UE.

In at least some embodiments, the determining unit determining, based on the sub address segment to which the UE IP address belongs and the location area to which the UE belongs, the user plane network element device configured to deliver a route to the UE includes when the location area to which the UE belongs corresponds to a plurality of user plane network element devices, determining whether an available route corresponding to the sub address segment to which the UE IP address belongs is delivered; and if the available route is delivered, selecting a user plane network element device that delivers the available route to deliver the route to the UE.

In at least some embodiments, the apparatus includes a processor and a transceiver, the transceiver is configured to perform corresponding functions of the sending unit and the receiving unit, and the processor is configured to perform a corresponding function of the determining unit. The apparatus may further include a memory. The memory is configured to couple to the processor, and the memory stores a program instruction and data that are necessary for the apparatus.

At least one embodiment of the invention provides a route delivery apparatus, and the apparatus has a function of implementing behavior of the control plane network element device in the route delivery method in the second aspect. The function may be implemented by hardware, or may be implemented by hardware by executing corresponding software. The hardware or the software includes one or more modules corresponding to the function.

In at least some embodiments, the apparatus includes a receiving unit, configured to: receive location information of UE; and determine, based on the location information, a location area to which the UE belongs;

a sending unit, configured to send information about the location area to a user plane network element device, so that the user plane network element device determines, based on the information about the location area, a client IP address used by the user plane network element device to access a third-party server, where the receiving unit is further configured to receive a UE IP address sent by the user plane network element device, where the UE IP address is assigned by the third-party server based on the client IP address when the user plane network element device accesses the third-party server by using the client IP address; and a processing unit, configured to determine, based on the UE IP address and the information about the location area, another user plane network element device configured to deliver a route to the UE.

In at least some embodiments, the receiving unit receiving location information of UE includes receiving a create session request message, where the create session request message carries the location information or indication information of the location information.

In at least some embodiments, the client IP address corresponds to an address range, and the address range is divided into a plurality of sub address segments.

In at least some embodiments, the processing unit determining, based on the UE IP address and the information about the location area, another user plane network element device configured to deliver a route to the UE includes determining a sub address segment to which the UE IP address belongs; and determining, based on the sub address segment to which the UE IP address belongs and the location area to which the UE belongs, the another user plane network element device configured to deliver a route to the UE.

In at least some embodiments, the processing unit determining, based on the sub address segment to which the UE IP address belongs and the location area to which the UE belongs, the another user plane network element device configured to deliver a route to the UE includes when the location area to which the UE belongs corresponds to a plurality of user plane network element devices, determining whether an available route corresponding to the sub address segment to which the UE IP address belongs is delivered; and if the available route is delivered, selecting a user plane network element device that delivers the available route to deliver the route to the UE.

In at least some embodiments, the apparatus includes a processor and a transceiver. The transceiver is configured to perform corresponding functions of the sending unit and the receiving unit, and the processor is configured to perform a corresponding function of the processing unit. The apparatus may further include a memory. The memory is configured to couple to the processor, and the memory stores a program instruction and data that are necessary for the apparatus.

At least one embodiment of the invention provides a route delivery apparatus, and the apparatus has a function of implementing behavior of the user plane network element device in the third aspect. The function may be implemented by hardware, or may be implemented by hardware by executing corresponding software. The hardware or the software includes one or more modules corresponding to the function.

In at least some embodiments, the apparatus includes a receiving unit, configured to receive information about a location area sent by a control plane network element device;

a determining unit, configured to determine, based on the information about the location area, a client IP address used by the user plane network element device to access a third-party server; and a sending unit, configured to send an access request message to the third-party server by using the client IP address.

In at least some embodiments, the receiving unit is further configured to receive a UE IP address assigned by the third-party server to the UE based on the client IP address.

In at least some embodiments, the sending unit is further configured to send the UE IP address to the control plane network element device, so that the control plane network element device determines, based on the UE IP address and the information about the location area, another user plane network element device configured to deliver a route to the UE.

In at least some embodiments, the determining unit determining, based on the information about the location area, a client IP address used by the user plane network element device to access a third-party server includes selecting one of at least one candidate IP address corresponding to the location area as the client IP address.

In at least some embodiments, when the location area corresponds to a plurality of candidate IP addresses, the determining unit selecting one of a plurality of candidate IP addresses corresponding to the location area as the client IP address includes selecting, from the plurality of candidate IP addresses corresponding to the location area, one candidate IP address whose usage frequency is less than a preset threshold as the client IP address.

In at least some embodiments, the apparatus includes a processor and a transceiver. The transceiver is configured to perform corresponding functions of the sending unit and the receiving unit, and the processor is configured to perform a corresponding function of the determining unit. The apparatus may further include a memory. The memory is configured to couple to the processor, and the memory stores a program instruction and data that are necessary for the apparatus.

At least one embodiment of the invention provides a computer readable storage medium, and the computer readable storage medium stores an instruction. When the instruction runs on a computer, the computer performs the methods as described herein.

At least one embodiment of the invention provides a computer program product including an instruction. When the computer program product runs on a computer, the computer performs the methods as described herein.

According to the route delivery method and device in the embodiments of the invention, the problem that a same network segment route may be assigned to different UEs when a third-party server assigns a UE IP address in a CU-separated system architecture can be resolved.

DESCRIPTION OF EMBODIMENTS

Figure 1:
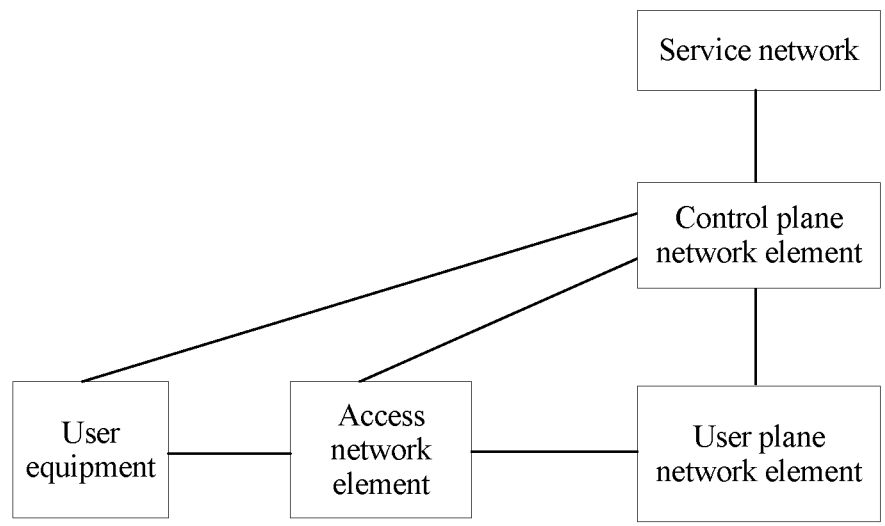
FIG. 1 is a schematic diagram of a possible application scenario according to an embodiment of the application.

FIG. 1 is a schematic diagram of a possible application scenario according to an embodiment of the application. As shown in FIG. 1, a system includes UE, an access network element (AN), a user plane (UP) network element, a control plane (CP) network element, and a service network.

The system shown in FIG. 1 is a system in which a UP network element is separated from a CP network element. For example, in a possible design, an original PGW is split into a PGW-C and a PGW-U, an original SGW is split into an SGW-C and an SGW-U, and the PGW-C and the SGW-C may be collectively referred to as a CP network element. During actual deployment, the PGW-C and the SGW-C may be separately deployed, or may be integrated together. The PGW-U and the SGW-U may be collectively referred to as a UP network element. During actual deployment, the PGW-U and the SGW-U may be separately deployed, or may be integrated together. In the system shown in FIG. 1, one CP network element may correspond to one or more UP network elements, and different UP network elements may cover different tracking area list (Tracking Area list, TA list) ranges.

Figure 2:
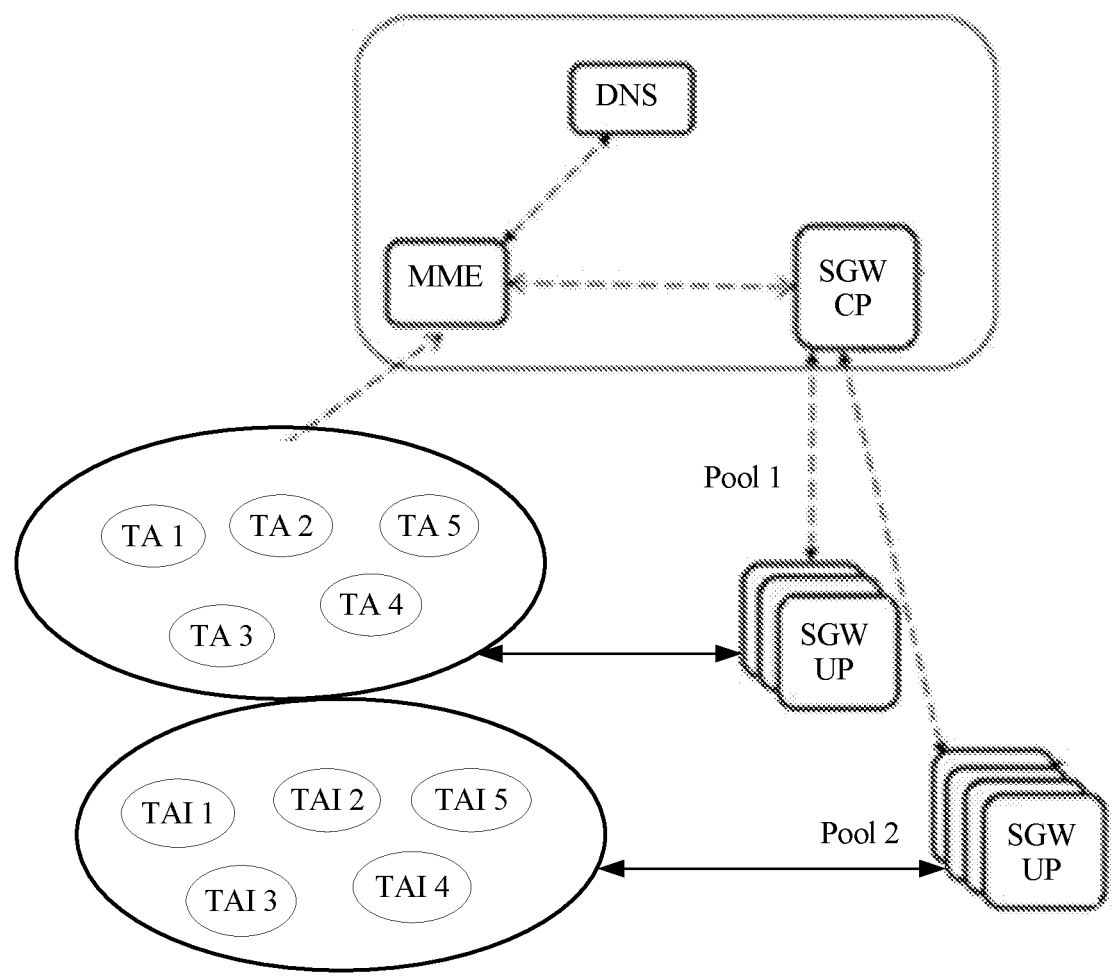
FIG. 2 is a schematic diagram of a system in which CU-separated deployment is performed according to one embodiment.

FIG. 2 is a schematic diagram of a system in which CU-separated deployment is performed according to one embodiment. As shown in FIG. 2, an SGW-C is deployed above an SGW-U, and the SGW-C manages a plurality of SGW-Us or a plurality of SGW-U pools. Each SGW-U pool covers at least one TA list, and TA lists covered by different SGW-Us may be all different, or may be partially or completely the same.

In the systems shown in FIG. 1 and FIG. 2, when UE needs to access a network, a UE IP address needs to be assigned to the UE. The UE IP address may be assigned by the CP network element, or may be assigned by a third-party server, for example, may be assigned by an AAA server or a DHCP server. Regardless of an assignment manner, the UE IP address needs to be sent by the CP network element to UP network element using an Sx session establishment request, and a route of a downlink data packet from an operator's IP address of a server to an operator's IP address of the UE is advertised by the PGW-U.

In a CU-separated scenario, when two UEs that are respectively located in different UP network element ranges need to be activated, UP network elements to which the two UEs respectively belong may correspond to a same CP network element. To avoid a case in which UE IP addresses that are received by the CP network element and that are assigned by the third-party server to the two UEs are in a same network segment, embodiments of the invention provide the following route delivery solutions.

Figure 3:
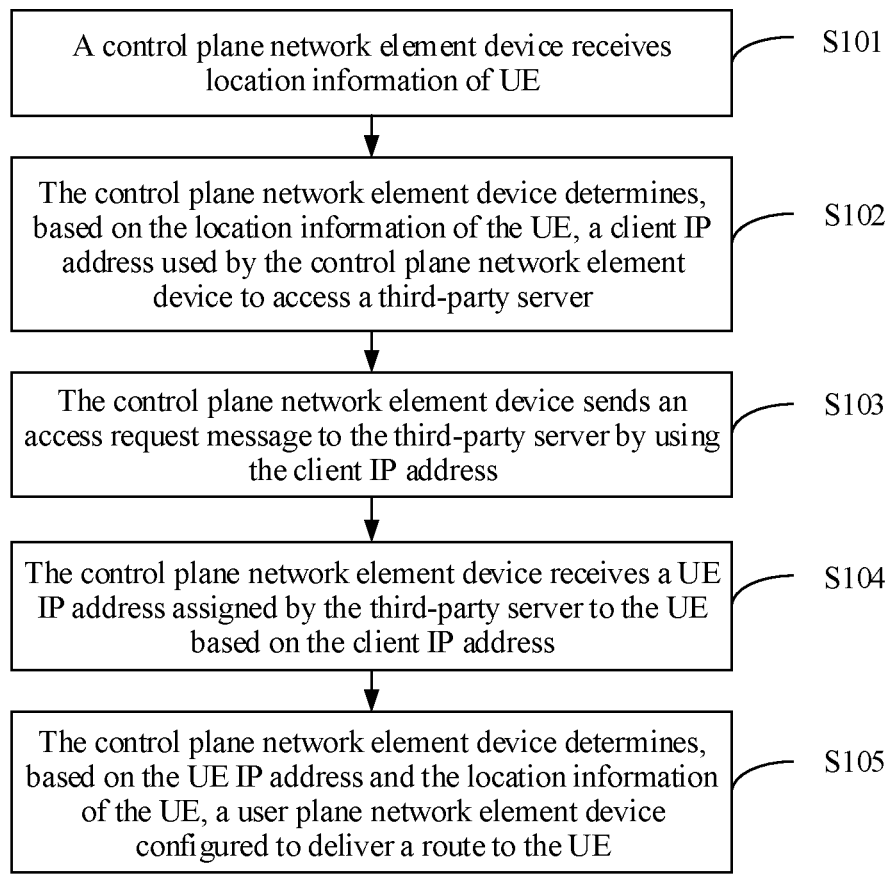
FIG. 3 is a flowchart of a route delivery method according to according to an embodiment of the application.

FIG. 3 is a flowchart of a route delivery method according to an embodiment of the application. As shown in FIG. 3, the method includes the following processing operations.

Operation S101: A control plane network element device receives location information of UE.

In at least one embodiment of the invention, when the UE needs to be activated, the control plane network element device obtains the location information of the UE. For example, the control plane network element device receives a create session request message of the UE, and adds the location information of the UE or indication information of the location information of the UE to the create session request message. Optionally, the location information may be a cell identifier of a cell accessed by the UE.

Operation S102: The control plane network element device determines, based on the location information of the UE, a client IP address used by the control plane network element device to access a third-party server.

In at least one embodiment of the invention, a mapping relationship is established between location information of the UE and a client IP address. For example, one location area corresponds to one or more client IP addresses, and one location area corresponds to one or more UP network elements.

That the control plane network element device determines, based on the location information of the UE, a client IP address used by the control plane network element device to access a third-party server includes:

determining, by the control plane network element device based on the location information of the UE, a location area to which the UE belongs, for example, determining a TA list to which the UE belongs; and selecting, by the control plane network element device, one of at least one candidate IP address corresponding to the location area to which the UE belongs as the client IP address used by the control plane network element device to access the third-party server.

In at least one embodiment of the invention, when a location area corresponds to a plurality of candidate IP addresses, the control plane network element device may select, from the plurality of candidate IP addresses corresponding to the location area, one candidate IP address whose usage frequency is less than a preset threshold as the client IP address used by the control plane network element device to access the third-party server.

Operation S103: The control plane network element device sends an access request message to the third-party server by using the client IP address. After the third-party server receives the access request message, the third-party server assigns a UE IP address to the UE based on the client IP address.

Operation S104: The control plane network element device receives the UE IP address assigned by the third-party server to the UE based on the client IP address.

Operation S105: The control plane network element device determines, based on the UE IP address and the location information of the UE, a user plane network element device configured to deliver a route to the UE.

In at least one embodiment of the invention, each client IP address corresponds to an address range, and the address range is divided into a plurality of sub address segments.

Correspondingly, that the control plane network element device determines, based on the UE IP address and the location information of the UE, a user plane network element device configured to deliver a route to the UE includes: determining, by the control plane network element device, a sub address segment to which the UE IP address belongs; and determining, by the control plane network element device based on the sub address segment to which the UE IP address belongs and the location area to which the UE belongs, the user plane network element device configured to deliver a route to the UE.

Specifically, when the location area to which the UE belongs corresponds to a plurality of user plane network element devices, the control plane network element device determines whether an available route corresponding to the sub address segment to which the UE IP address belongs is delivered. If the available route is delivered, the control plane network element device selects a user plane network element device that delivers the available route to deliver the route to the UE.

In at least one embodiment of the invention, a mapping relationship is established between a location information of the UE and a client IP address. In a process of activating the UE, the control plane network element device determines, based on a location information of the UE, a client IP address used to access the third-party server. Therefore, when UEs in different user plane network element devices managed by the control plane network element device are activated, the control plane network element device accesses the third-party server by using different client IP addresses, so as to avoid a case in which UE IP addresses assigned by the third-party server to different UEs belong to a same network segment.

Figure 4:
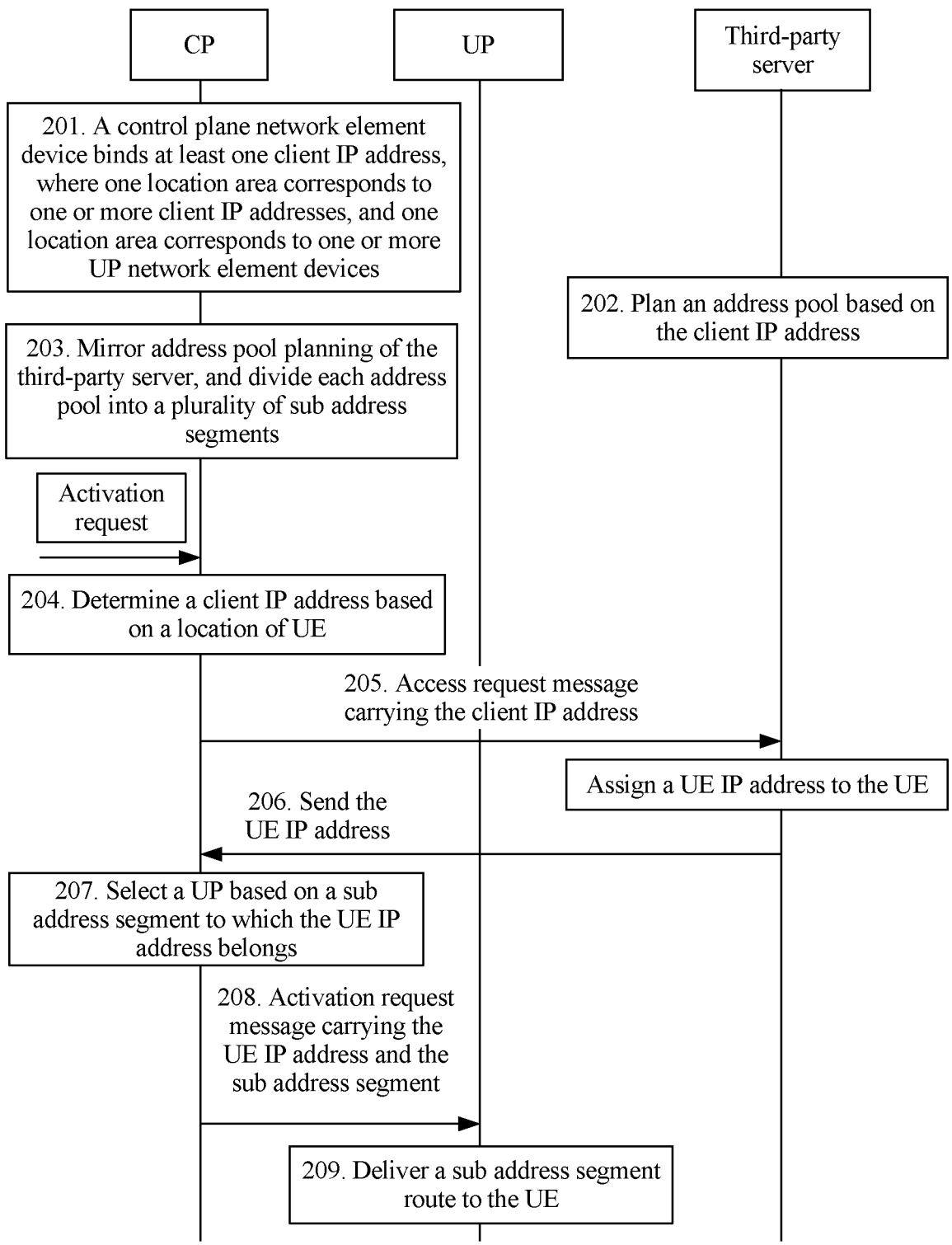
FIG. 4 is a flowchart of another route delivery method according to an embodiment of the application.

FIG. 4 is a flowchart of another route delivery method according to an embodiment of the application. As shown in FIG. 4, the method includes the following processing operations.

Operation S201: A control plane network element device binds at least one client IP address, where one location area (such as a TA list) corresponds to one or more client IP addresses, and one location area corresponds to one or more UP network elements.

Operation S202: In a CU-separated scenario, a quantity of client IP addresses increases because a quantity of UP network elements increases. An address pool on a third-party server is planned based on the client IP address. Different client IP addresses correspond to different address pools. When the control plane network element device applies to the third-party server for addresses by using different client IP addresses, the addresses assigned by the third-party server belong to different address pools, and do not belong to a same sub address segment.

Operation S203: The control plane network element device performs local mirroring configuration on the address pool of the third-party server based on planning of the address pool of the third-party server, and voluntarily splits the address pool into a plurality of sub address segments.

Operation S204: When the control plane network element device receives an activation request, for example, receives a create session request message of UE, the control plane network element device determines, based on a user access location, a user plane network element device in a TA list area in which the UE is located, so as to determine a client IP address corresponding to the user plane network element device.

Operation S205: The control plane network element device sends an access request message to the third-party server, where the access request message carries the determined client IP address.

Operation S206: The third-party server assigns a UE IP address to the UE based on the client IP address in the access request message, and sends the UE IP address to the control plane network element device.

Operation S207: The control plane network element device determines a sub address segment to which the UE IP address assigned by the third-party server belongs. When a plurality of user plane network element devices cover a same location area (such as a TA list), the control plane network element device determines whether a route of the sub address segment to which the UE IP address belongs is delivered by a user plane network element device; and if the route is delivered by a user plane network element device, the control plane network element device selects the user plane network element device to deliver the route to the UE; or if the route is not delivered by a user plane network element device, the control plane network element device may select, according to another policy such as a load sharing principle, a user plane network element device to deliver the route to the UE.

Operation S208: The control plane network element device sends the activation request to the user plane network element device selected in operation S207, where the activation request carries the UE IP address and the sub address segment to which the UE IP address belongs.

Operation S209: The user plane network element device delivers the sub address segment route to the UE, and returns a response message to the control plane network element device.

To prevent a newly deployed UP network element device from frequently changing planning of the address pool on the third-party server, the quantity of client IP addresses may be planned at an initial stage based on an expected maximum quantity of areas. For example, it is expected that 100 user plane network element devices with different coverage areas are finally deployed, and only 10 user plane network element devices are deployed at a first stage. In this case, 100 client IP addresses are planned.

In this planning manner, when a quantity of areas obtained through division during actual deployment is less than the planned and expected maximum quantity of areas (that is, the quantity of client IP addresses), if a UP network element device in each TA list area corresponds to only one client IP address, a case in which address pools corresponding to some client IP addresses are not used may occur. To avoid this case, the control plane network element device may bind a plurality of client IP addresses to a UP network element device in a specific TA list area (or a specific group of TA list areas). In addition, the control plane network element device collects statistics about utilization of the address pool based on the client IP address. When the utilization exceeds a threshold, the control plane network element device applies to the third-party server for an address by using another client IP address bound to the UP network element device in this TA list area. When a user plane network element device is newly added, the control plane network element device adjusts a binding relationship between a client IP address and a user plane network element device.

Figure 5:
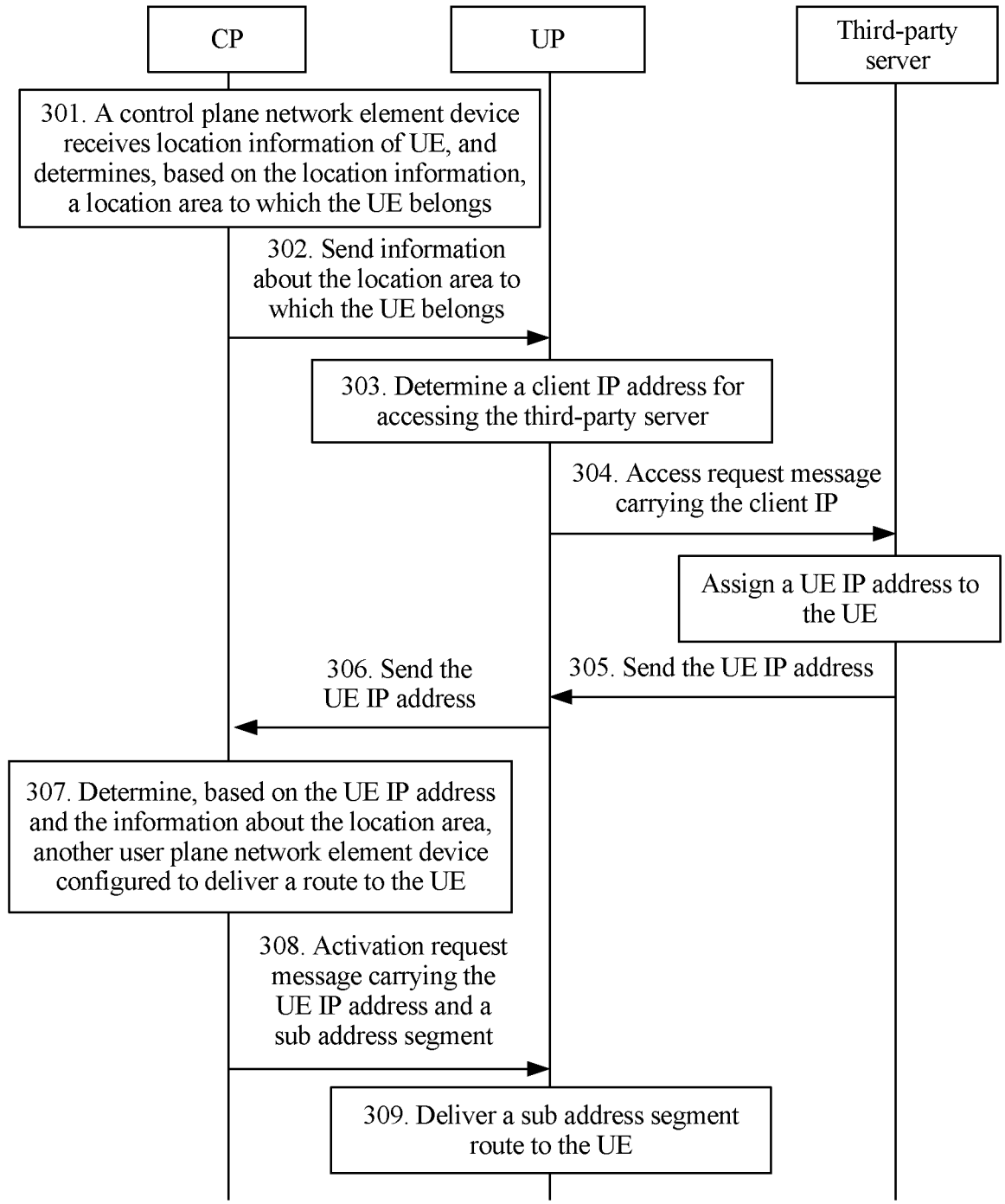
FIG. 5 is a flowchart of still another route delivery method according to an embodiment of the application.

FIG. 5 is a flowchart of still another route delivery method according to an embodiment of the application. In at least one embodiment of the invention, a control plane network element device does not directly communicate with a third-party server, but exchanges information with the third-party server through forwarding by a user plane network element device. As shown in FIG. 5, the method includes the following operations.

Operation S301: The control plane network element device receives location information of UE, and determines, based on the location information, a location area to which the UE belongs.

In at least one embodiment of the invention, when the UE needs to be activated, the control plane network element device obtains the location information of the UE. For example, the control plane network element device receives a create session request message of the UE, and adds the location information of the UE or indication information of the location information of the UE to the create session request message. Optionally, the location information may be a cell identifier of a cell accessed by the UE. The control plane network element device may determine, based on the cell identifier of the UE, the location area to which the UE belongs, for example, may determine a TA list to which the UE belongs.

Operation S302: The control plane network element device sends information about the location area to which the UE belongs to the user plane network element device.

Operation S303: The user plane network element device determines, based on the location area to which the UE belongs, a client IP address used by the user plane network element device to access the third-party server.

That the user plane network element device determines, based on the information about the location area, a client IP address used by the user plane network element device to access the third-party server includes:

selecting, by the control plane network element device, one of at least one candidate IP address corresponding to the location area as the client IP address.

When the location area corresponds to a plurality of candidate IP addresses, the selecting, by the control plane network element device, one of a plurality of candidate IP addresses corresponding to the location area as the client IP address includes:

selecting, by the control plane network element device from the plurality of candidate IP addresses corresponding to the location area, one candidate IP address whose usage frequency is less than a preset threshold as the client IP address.

Operation S304: The user plane network element device sends an access request message to the third-party server by using the client IP address.

Operation S305: The user plane network element device obtains, from the third-party server, a UE IP address assigned by the third-party server based on the client IP address.

Operation S306: The user plane network element device sends the UE IP address to the control plane network element device.

Operation S307: The control plane network element device determines, based on the UE IP address and the information about the location area, another user plane network element device configured to deliver a route to the UE.

In at least one embodiment of the invention, each client IP address corresponds to an address range, and the address range is divided into a plurality of sub address segments.

After the control plane network element device receives the UE IP address, the control plane network element device determines a sub address segment to which the UE IP address belongs; and determines, based on the sub address segment to which the UE IP address belongs and the location area to which the UE belongs, the another user plane network element device configured to deliver a route to the UE.

That the control plane network element device determines, based on the sub address segment to which the UE IP address belongs and the location area to which the UE belongs, the another user plane network element device configured to deliver a route to the UE includes: when the location area to which the UE belongs corresponds to a plurality of user plane network element devices, determining, by the control plane network element device, whether an available route corresponding to the sub address segment to which the UE IP address belongs is delivered; and if the available route is delivered, selecting, by the control plane network element device, a user plane network element device that delivers the available route to deliver the route to the UE.

Operation S308: The control plane network element device sends an activation request to the another user plane network element device, where the activation request carries the UE IP address and the sub address segment to which the UE IP address belongs.

Operation S309: The user plane network element device delivers a sub address segment route to the UE, and returns a response message to the control plane network element device.

Figure 6A:
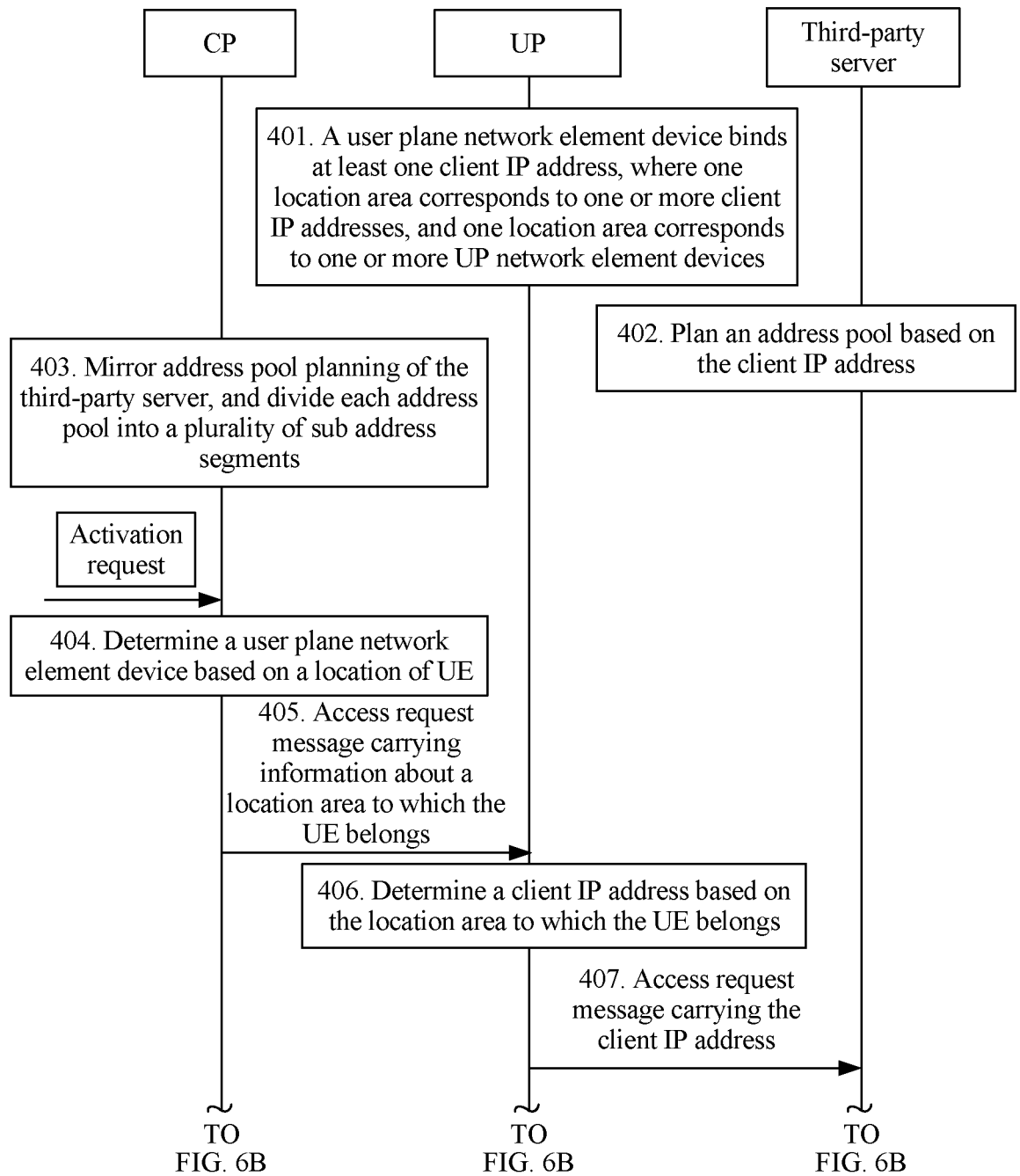
FIG. 6A and FIG. 6B are a flowchart of yet another route delivery method according to an embodiment of the application.
Figure 6B:
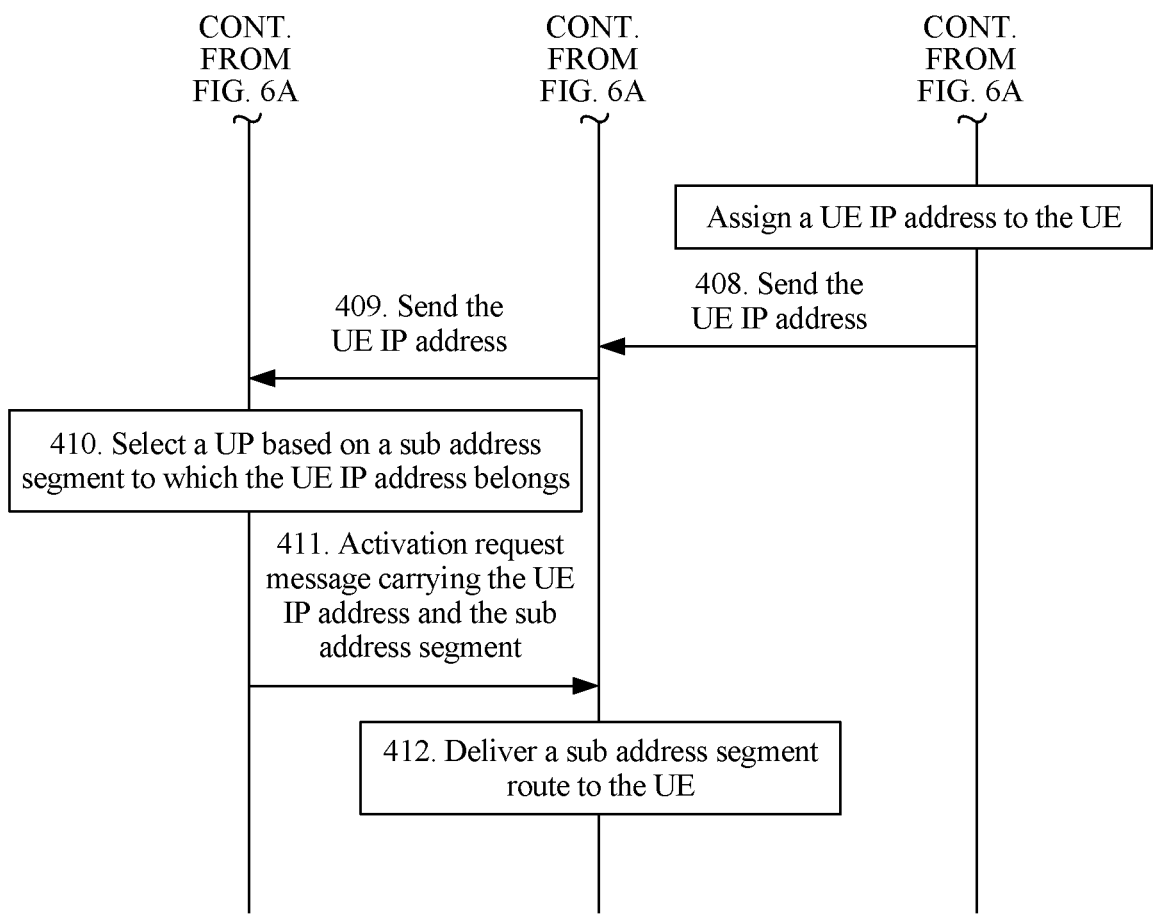

FIG. 6A and FIG. 6B are a flowchart of yet another route delivery method according to an embodiment of the application. In at least one embodiment of the invention, a control plane network element device does not directly communicate with a third-party server, but exchanges information with the third-party server through forwarding by a user plane network element device. As shown in FIG. 6A and FIG. 6B, the method includes the following processing operations.

Operation S401: The user plane network element device binds at least one client IP address, where one location area (such as a TA list) corresponds to one or more client IP addresses, and one location area corresponds to one or more UP network elements.

Operation S402: In a CU-separated scenario, a quantity of client IP addresses increases because a quantity of UP network elements increases. An address pool on the third-party server is planned based on the client IP address. Different client IP addresses correspond to different address pools. When the control plane network element device applies to the third-party server for addresses by using different client IP addresses, the addresses assigned by the third-party server belong to different address pools, and do not belong to a same sub address segment.

Operation S403: The control plane network element device performs local mirroring configuration on the address pool of the third-party server based on planning of the address pool of the third-party server, and voluntarily splits the address pool into a plurality of sub address segments.

Operation S404: When the control plane network element device receives an activation request, for example, receives a create session request message of UE, the control plane network element device determines, based on a user access location, a user plane network element device in a TA list area in which the UE is located.

Operation S405: The control plane network element device sends an access request message to the user plane network element device, and adds information about a location area to which the UE belongs to the access request message.

Operation S406: The user plane network element device determines a client IP address based on the location area to which the UE belongs.

Operation S407: The user plane network element device sends the access request message to the third-party server, where the access request message carries the determined client IP address.

Operation S408: The third-party server assigns a UE IP address to the UE based on the client IP address in the access request message, and sends the UE IP address to the user plane network element device.

Operation S409: The user plane network element device sends ta response message to the control plane network element device, and adds the UE IP address to the response message.

Operation S410: The control plane network element device determines a sub address segment to which the UE IP address assigned by the third-party server belongs. When a plurality of user plane network element devices cover a same location area (such as a TA list), the control plane network element device determines whether a route of the sub address segment to which the UE IP address belongs is delivered by a user plane network element device; and if the route is delivered by a user plane network element device, the control plane network element device selects the user plane network element device to deliver the route to the UE; or if the route is not delivered by a user plane network element device, the control plane network element device may select, according to another policy such as a load sharing principle, a user plane network element device to deliver the route to the UE.

Operation S411: The control plane network element device sends the activation request to the user plane network element device selected in operation S410 (in FIG. 6A and FIG. 6B, it is assumed that the user plane network element device in operation S401 to operation S409 is different from the user plane network element device selected in operation S410), where the activation request carries the UE IP address and the sub address segment to which the UE IP address belongs.

Operation S412: The user plane network element device delivers the sub address segment route to the UE, and returns a response message to the control plane network element device.

To prevent a newly deployed UP network element device from frequently changing planning of the address pool on the third-party server, the quantity of client IP addresses may be planned at an initial stage based on an expected maximum quantity of areas. For example, it is expected that 100 user plane network element devices with different coverage areas are finally deployed, and only 10 user plane network element devices are deployed at a first stage. In this case, 100 client IP addresses are planned.

In this planning manner, when a quantity of areas obtained through division during actual deployment is less than the planned and expected maximum quantity of areas (that is, the quantity of client IP addresses), if a UP network element device in each TA list area corresponds to only one client IP address, a case in which address pools corresponding to some client IP addresses are not used occurs. To avoid this case, the control plane network element device may bind a plurality of client IP addresses to a UP network element device in a specific TA list area (or a specific group of TA list areas). In addition, the control plane network element device collects statistics about utilization of the address pool based on the client IP address. When the utilization exceeds a threshold, the control plane network element device applies to the third-party server for an address by using another client IP address bound to the UP network element device in this TA list area. When a user plane network element device is newly added, the control plane network element device adjusts a binding relationship between a client IP address and a user plane network element device.

In at least one embodiment of the invention, the third-party server may be an AAA server or a DHCP server. When the control plane network element device applies to the AAA server for the UE IP address, a type of a client IP address used to interact with the AAA server is a client IP address. When the control plane network element device applies to the DHCP server for the UE IP address, a type of a client IP address used to interact with the DHCP server is an agent IP address.

Figure 7:
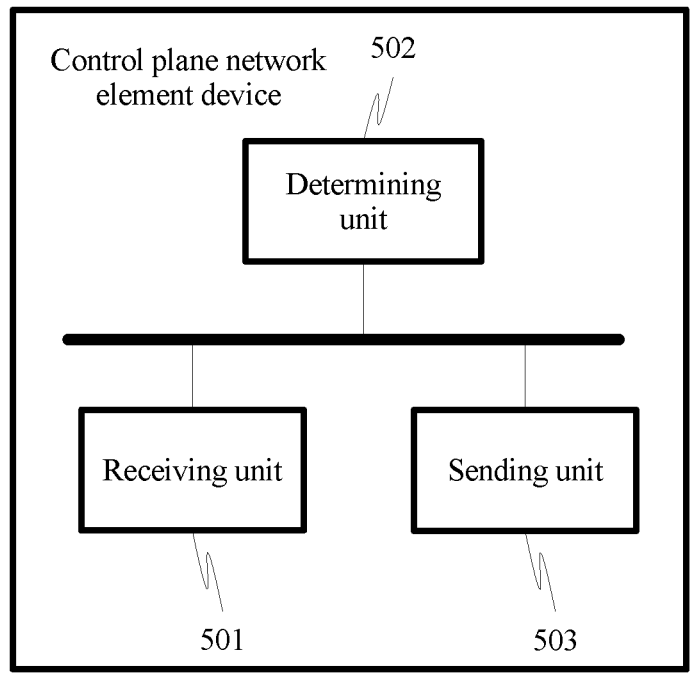
FIG. 7 is a schematic structural diagram of a control plane network element device according to an embodiment of the application.

FIG. 7 is a schematic structural diagram of a control plane network element device according to an embodiment of the application. As shown in FIG. 7, the control plane network element device includes:

a receiving unit 501, configured to receive location information of user equipment UE;

a determining unit 502, configured to determine, based on the location information, a client IP address used by the control plane network element device to access a third-party server; and a sending unit 503, configured to send an access request message to the third-party server by using the client IP address.

The receiving unit 501 is further configured to receive a UE IP address assigned by the third-party server to the UE based on the client IP address.

The determining unit 502 is further configured to determine, based on the UE IP address and the location information, a user plane network element device configured to deliver a route to the UE.

In a possible design, that the receiving unit 501 receives location information of UE includes:

receiving a create session request message, where the create session request message carries the location information or indication information of the location information.

In a possible design, that the determining unit 502 determines, based on the location information, a client IP address used by the control plane network element device to access a third-party server includes:

determining, based on the location information of the UE, a location area to which the UE belongs; and selecting one of at least one candidate IP address corresponding to the location area as the client IP address.

In a possible design, when the location area corresponds to a plurality of candidate IP addresses, that the determining unit 502 selects one of a plurality of candidate IP addresses corresponding to the location area as the client IP address includes:

selecting, from the plurality of candidate IP addresses corresponding to the location area, one candidate IP address whose usage frequency is less than a preset threshold as the client IP address.

In a possible design, the client IP address corresponds to an address range, and the address range is divided into a plurality of sub address segments.

That the determining unit 502 determines, based on the UE IP address and the location information, a user plane network element device configured to deliver a route to the UE includes:

determining a sub address segment to which the UE IP address belongs; and determining, based on the sub address segment to which the UE IP address belongs and the location area to which the UE belongs, the user plane network element device configured to deliver a route to the UE.

In a possible design, that the determining unit 502 determines, based on the sub address segment to which the UE IP address belongs and the location area to which the UE belongs, the user plane network element device configured to deliver a route to the UE includes:

when the location area to which the UE belongs corresponds to a plurality of user plane network element devices, determining whether an available route corresponding to the sub address segment to which the UE IP address belongs is delivered; and if the available route is delivered, selecting a user plane network element device that delivers the available route to deliver the route to the UE.

In at least one embodiment of the invention, a mapping relationship is established between a location information of the UE and a client IP address. In a process of activating the UE, the control plane network element device determines, based on a location information of the UE, a client IP address used to access the third-party server. Therefore, when UEs in different user plane network element devices managed by the control plane network element device are activated, the control plane network element device accesses the third-party server by using different client IP addresses, so as to avoid a case in which UE IP addresses assigned by the third-party server to different UEs belong to a same network segment.

Figure 8:
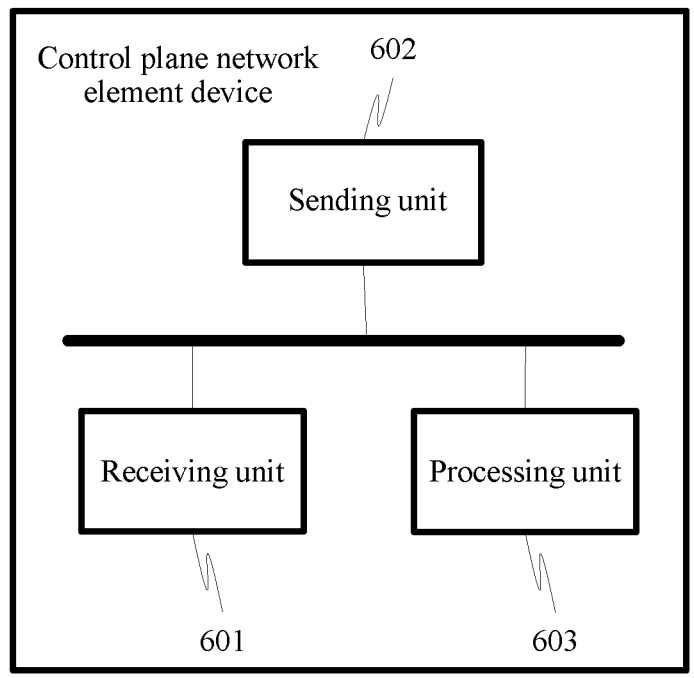
FIG. 8 is a schematic structural diagram of another control plane network element device according to an embodiment of the application.

FIG. 8 is a schematic structural diagram of another control plane network element device according to an embodiment of the application. As shown in FIG. 8, the control plane network element device includes:

a receiving unit 601, configured to: receive location information of UE;

and determine, based on the location information, a location area to which the UE belongs;

a sending unit 602, configured to send information about the location area to a user plane network element device, so that the user plane network element device determines, based on the information about the location area, a client IP address used by the user plane network element device to access a third-party server, where the receiving unit 601 is further configured to receive a UE IP address sent by the user plane network element device, where the UE IP address is assigned by the third-party server based on the client IP address when the user plane network element device accesses the third-party server by using the client IP address; and a processing unit 603, configured to determine, based on the UE IP address and the information about the location area, another user plane network element device configured to deliver a route to the UE.

In a possible design, that the receiving unit 601 receives location information of UE includes:

receiving a create session request message, where the create session request message carries the location information or indication information of the location information.

In a possible design, the client IP address corresponds to an address range, and the address range is divided into a plurality of sub address segments.

That the processing unit 603 determines, based on the UE IP address and the information about the location area, another user plane network element device configured to deliver a route to the UE includes:

determining a sub address segment to which the UE IP address belongs; and determining, based on the sub address segment to which the UE IP address belongs and the location area to which the UE belongs, the another user plane network element device configured to deliver a route to the UE.

In a possible design, that the processing unit 603 determines, based on the sub address segment to which the UE IP address belongs and the location area to which the UE belongs, the another user plane network element device configured to deliver a route to the UE includes:

when the location area to which the UE belongs corresponds to a plurality of user plane network element devices, determining whether an available route corresponding to the sub address segment to which the UE IP address belongs is delivered; and if the available route is delivered, selecting a user plane network element device that delivers the available route to deliver the route to the UE.

In at least one embodiment of the invention, a mapping relationship is established between a location information of the UE and a client IP address. In a process of activating the UE, the control plane network element device determines, based on a location information of the UE, a client IP address used to access the third-party server. Therefore, when UEs in different user plane network element devices managed by the control plane network element device are activated, the control plane network element device accesses the third-party server by using different client IP addresses, so as to avoid a case in which UE IP addresses assigned by the third-party server to different UEs belong to a same network segment.

Figure 9:
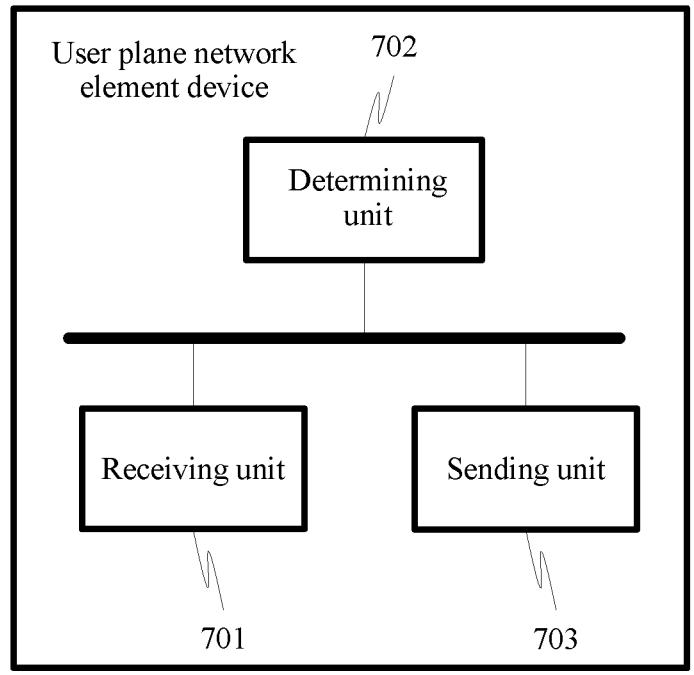
FIG. 9 is a schematic structural diagram of a user plane network element device according to an embodiment of the application.

FIG. 9 is a schematic structural diagram of a user plane network element device according to an embodiment of the application. As shown in FIG. 9, the user plane network element device includes: a receiving unit 701, configured to receive information about a location area sent by a control plane network element device;

a determining unit 702, configured to determine, based on the information about the location area, a client IP address used by the user plane network element device to access a third-party server; and a sending unit 703, configured to send an access request message to the third-party server by using the client IP address.

The receiving unit 701 is further configured to receive a UE IP address assigned by the third-party server to the UE based on the client IP address.

The sending unit 703 is further configured to send the UE IP address to the control plane network element device, so that the control plane network element device determines, based on the UE IP address and the information about the location area, another user plane network element device configured to deliver a route to the UE.

In a possible design, that the determining unit 702 determines, based on the information about the location area, a client IP address used by the user plane network element device to access a third-party server includes:

selecting one of at least one candidate IP address corresponding to the location area as the client IP address.

In a possible design, when the location area corresponds to a plurality of candidate IP addresses, that the determining unit 702 selects one of a plurality of candidate IP addresses corresponding to the location area as the client IP address includes:

selecting, from the plurality of candidate IP addresses corresponding to the location area, one candidate IP address whose usage frequency is less than a preset threshold as the client IP address.

In at least one embodiment of the invention, a mapping relationship is established between a location information of the UE and a client IP address. In a process of activating the UE, the control plane network element device determines, based on a location information of the UE, a client IP address used to access the third-party server. Therefore, when UEs in different user plane network element devices managed by the control plane network element device are activated, the control plane network element device accesses the third-party server by using different client IP addresses, so as to avoid a case in which UE IP addresses assigned by the third-party server to different UEs belong to a same network segment.

Figure 10:
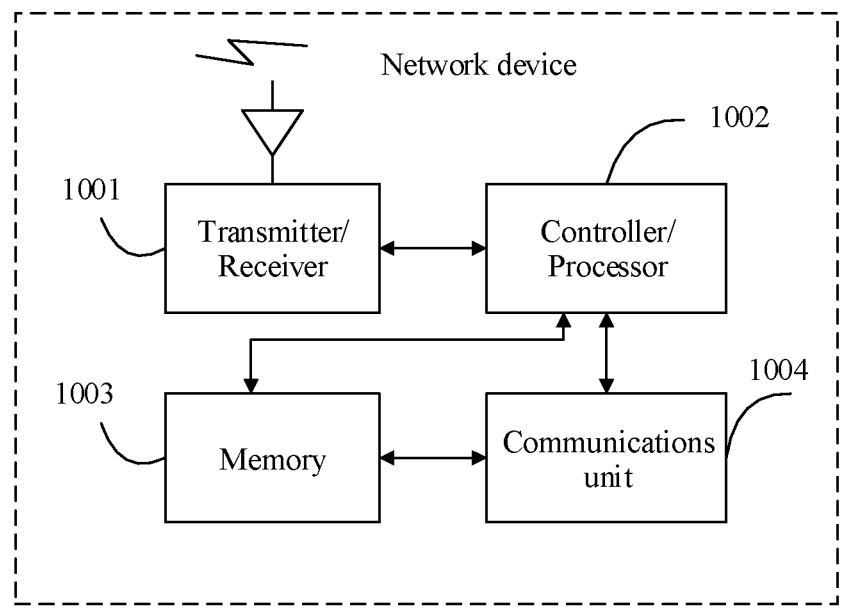
FIG. 10 is a possible schematic structural diagram of a network device according to an embodiment of the application.

FIG. 10 is a possible schematic structural diagram of a network device according to an embodiment of the application. Optionally, the network device shown in FIG. 10 may be configured to perform a function implemented by the control plane network element device shown in FIG. 7 or FIG. 8. Optionally, the network device shown in FIG. 10 may be alternatively configured to perform a function implemented by the user plane network element device shown in FIG. 9. As shown in FIG. 10, the network device includes a transmitter/receiver 1001, a controller/processor 1002, a memory 1003, and a communications unit 1004. The transmitter/receiver 1001 is configured to: support information receiving and sending between the network device and the UE in the foregoing embodiments; and support radio communication between the network device and another network device. The controller/processor 1002 performs various functions for communicating with the UE or another network device. In an uplink, an uplink signal from the UE is received by an antenna, demodulated by the receiver 1001, and further processed by the controller/processor 1002, so as to restore service data and signaling message that are sent by the UE. In a downlink, service data and a signaling message are processed by the controller/processor 1002 and are demodulated by the transmitter 1001 to generate a downlink signal, and the downlink signal is transmitted to another network device or the UE by using an antenna. The controller/processor 1002 further performs the route delivery method performed by the network device in the solutions of the embodiments of the invention. The memory 1003 is configured to store program code and data of the network device. The communications unit 1004 is configured to support the network device in communicating with another network entity.

Optionally, when the network device shown in FIG. 10 serves as the control plane network element device shown in FIG. 7 to perform the route delivery method in the embodiments of the invention, the controller/processor 1002 in FIG. 10 implements, independently or through cooperation with the memory 1003, a function implemented by the determining unit 502 in FIG. 7, and the transmitter/receiver 1001 is configured to implement functions implemented by the receiving unit 501 and the sending unit 503 in FIG. 7.

Optionally, when the network device shown in FIG. 10 serves as the control plane network element device shown in FIG. 8 to perform the route delivery method in the embodiments of the invention, the controller/processor 1002 in FIG. 10 implements, independently or through cooperation with the memory 1003, a function implemented by the processing unit 603 in FIG. 8, and the transmitter/receiver 1001 is configured to implement functions implemented by the receiving unit 601 and the sending unit 602 in FIG. 8.

Optionally, when the network device shown in FIG. 10 serves as the user plane network element device shown in FIG. 9 to perform the route delivery method in the embodiments of the invention, the controller/processor 1002 in FIG. 10 implements, independently or through cooperation with the memory 1003, a function implemented by the determining unit 702 in FIG. 9, and the transmitter/receiver 1001 is configured to implement functions implemented by the receiving unit 701 and the sending unit 702 in FIG. 9.

It can be understood that FIG. 10 shows merely a simplified design of the network device. In actual application, the network device may include any quantity of transmitters, receivers, processors, controllers, memories, communications units, and the like, and all network devices that can implement embodiments the invention shall fall within the protection scope of the embodiments of the invention.

The controller/processor configured to perform functions of the control plane network element device or the user plane network element device in embodiments of the invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logic blocks, modules, and circuits described with reference to content disclosed in embodiments of the invention. Alternatively, the processor may be a combination of processors implementing a computing function, for example, a combination of one or more microprocessors, or a combination of a DSP and a microprocessor.

Method or algorithm operations described in combination with the content disclosed in embodiments of the invention may be implemented by hardware, or may be implemented by a processor by executing a software instruction. The software instruction may include a corresponding software module. The software module may be located in a RAM, a flash, a ROM, an EPROM, an EEPROM memory, a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the STA. Certainly, the processor and the storage medium may exist in the STA as discrete components.

One of ordinary skill in the art should be aware that in the foregoing one or more examples, functions described in embodiments of the invention may be implemented by hardware, software, firmware, or any combination thereof. When the functions are implemented by the software, the functions may be implemented fully or partially in a form of a computer program product. The computer program product includes one or more computer program instructions. When the computer program instructions are loaded and executed on a computer, the procedures or functions according to the embodiments of the invention are fully or partially generated. The computer may be a general purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like.

The objectives, technical solutions, and benefits of embodiments of the invention are described in detail in the foregoing descriptions. It should be understood that the foregoing descriptions are merely implementations of embodiments of the invention, but are not intended to limit the protection scope of embodiments of the invention. Any modification, equivalent replacement, or improvement made based on the technical solutions of embodiments of the invention shall fall within the protection scope of embodiments of the invention.

What is claimed is:

1. A network method comprising:
    receiving, by a control plane network element device, a location information of a user equipment (UE);
    determining, by the control plane network element device based on the location information, a client IP address used by the control plane network element device to access a third-party server;
    sending, by the control plane network element device, an access request message to the third-party server carrying the client IP address;
    receiving, by the control plane network element device, a UE Internet Protocol (IP) address that is assigned by the third-party server to the UE based on the client IP address; and
    determining, by the control plane network element device based on the UE IP address and the location information, a user plane network element device that delivers a network route information to the UE.

2. The method according to claim 1, wherein the receiving, by the control plane network element device, the location information of the UE comprises:
    receiving, by the control plane network element device, a create session request message, wherein the create session request message carries the location information or indication information of the location information.

3. The method according to claim 1, wherein the determining, by the control plane network element device based on the location information, the client IP address used by the control plane network element device to access the third-party server comprises:
    determining, by the control plane network element device based on the location information of the UE, a location area to which the UE belongs; and
    selecting, by the control plane network element device, a candidate IP address corresponding to the location area as the client IP address.

4. The method according to claim 3, wherein when the location area corresponds to a plurality of candidate IP addresses, the selecting, by the control plane network element device, the candidate IP address corresponding to the location area as the client IP address comprises:
    selecting, by the control plane network element device from the plurality of candidate IP addresses corresponding to the location area, the candidate IP address whose usage frequency is less than a preset threshold as the client IP address.

5. The method according to claim 3, wherein the client IP address corresponds to an address range, and the address range is divided into a plurality of sub address segments; and
    the determining, by the control plane network element device based on the UE IP address and the location information, the user plane network element device comprises:
    determining, by the control plane network element device, a sub address segment to which the UE IP address belongs; and
    determining, by the control plane network element device based on the sub address segment to which the UE IP address belongs and the location area to which the UE belongs, the user plane network element device.

6. The method according to claim 5, wherein the determining, by the control plane network element device based on the sub address segment to which the UE IP address belongs and the location area to which the UE belongs, the user plane network element device comprises:
    when the location area to which the UE belongs corresponds to a plurality of user plane network element devices, determining, by the control plane network element device, whether an available route corresponding to the sub address segment to which the UE IP address belongs is delivered; and
    if the available route is delivered, selecting, by the control plane network element device, the user plane network element device that delivers the available route to the UE.

7. A network method comprising:
    receiving, by a control plane network element device, a location information of a user equipment (UE), and determining, based on the location information, a location area to which the UE belongs;
    sending, by the control plane network element device, information about the location area to a user plane network element device, so that the user plane network element device determines, based on the information about the location area, a client IP address used by the user plane network element device to access a third-party server;

receiving, by the control plane network element device, a UE Internet Protocol (IP) address sent by the user plane network element device, wherein the UE IP address is assigned by the third-party server based on the client IP address when the user plane network element device accesses the third-party server by using the client IP address; and determining, by the control plane network element device based on the UE IP address and the information about the location area, another user plane network element device that delivers a network route information to the UE.

8. The method according to claim 7, wherein the receiving, by the control plane network element device, the location information of the UE comprises:

receiving, by the control plane network element device, a create session request message, wherein the create session request message carries the location information or an indication information of the location information.

9. The method according to claim 7, wherein the client IP address corresponds to an address range, and the address range is divided into a plurality of sub address segments; and the determining, by the control plane network element device based on the UE IP address and the information about the location area, another user plane network element device comprises:

determining, by the control plane network element device, a sub address segment to which the UE IP address belongs; and determining, by the control plane network element device based on the sub address segment to which the UE IP address belongs and the location area to which the UE belongs, the another user plane network element device.

10. The method according to claim 9, wherein the determining, by the control plane network element device based on the sub address segment to which the UE IP address belongs and the location area to which the UE belongs, the another user plane network element device comprises:

when the location area to which the UE belongs corresponds to a plurality of user plane network element devices, determining, by the control plane network element device, whether an available route corresponding to the sub address segment to which the UE IP address belongs is delivered; and if the available route is delivered, selecting, by the control plane network element device, the user plane network element device that delivers the available route to the UE.

11. A network method comprising:

receiving, by a user plane network element device, information about a location area sent by a control plane network element device;

determining, by the user plane network element device based on the information about the location area, a client Internet Protocol (IP) address used by the user plane network element device to access a third-party server;

sending, by the user plane network element device, an access request message to the third-party server carrying the client IP address;

receiving, by the user plane network element device, a user equipment (UE) IP address that is assigned by the third-party server to the UE based on the client IP address; and sending, by the user plane network element device, the UE IP address to the control plane network element device, so that the control plane network element device determines, based on the UE IP address and the information about the location area, another user plane network element device that delivers a network route information to the UE.

12. The method according to claim 11, wherein the determining, by the user plane network element device based on the information about the location area, the client IP address used by the user plane network element device to access the third-party server comprises:

selecting, by the control plane network element device, a candidate IP address corresponding to the location area as the client IP address.

13. The method according to claim 12, wherein when the location area corresponds to a plurality of candidate IP addresses, the selecting, by the control plane network element device, the candidate IP address corresponding to the location area as the client IP address comprises:

selecting, by the control plane network element device from the plurality of candidate IP addresses corresponding to the location area, the candidate IP address whose usage frequency is less than a preset threshold as the client IP address.

14. A control plane network element device, comprising:
at least one processor; and
a memory coupled to the at least one processor, wherein the at least one processor is configured to:
receive a location information of a user equipment (UE);
determine based on the location information, a client Internet Protocol (IP) address used by the control plane network element device to access a third-party server; and
send an access request message to the third-party server carrying the client IP address;
receive a UE IP address that is assigned by the third-party server to the UE based on the client IP address; and
determine based on the UE IP address and the location information, a user plane network element device that delivers a network route information to the UE.

15. The device according to claim 14, wherein the at least one processor is further configured to:
receive a create session request message, wherein the create session request message carries the location information or an indication information of the location information.

16. The device according to claim 14, wherein the at least one processor is further configured to:
determine based on the location information of the UE, a location area to which the UE belongs; and
select a candidate IP address corresponding to the location area as the client IP address.

17. The device according to claim 16, wherein the at least one processor is further configured to: when the location area corresponds to a plurality of candidate IP addresses,
select from the plurality of candidate IP addresses corresponding to the location area, the candidate IP address whose usage frequency is less than a preset threshold as the client IP address.

18. The device according to claim 16, wherein the client IP address corresponds to an address range, and the address range is divided into a plurality of sub address segments; and wherein the at least one processor is further configured to:
determine a sub address segment to which the UE IP address belongs; and
determine, based on the sub address segment to which the UE IP address belongs and the location area to which the UE belongs, the user plane network element device.

19. The device according to claim 18, wherein the at least one processor is further configured to:
when the location area to which the UE belongs corresponds to a plurality of user plane network element devices, determining whether an available route corresponding to the sub address segment to which the UE IP address belongs is delivered; and
if the available route is delivered, select the user plane network element device that delivers the available route to the UE.

* * * * *